(12) United States Patent
Botella et al.

(10) Patent No.: US 10,989,309 B2
(45) Date of Patent: Apr. 27, 2021

(54) PILOTED EXHAUST LINE VALVE AND CORRESPONDING PRODUCTION METHOD

(71) Applicant: FAURECIA SYSTEMES D'ECHAPPEMENT, Nanterre (FR)

(72) Inventors: Ronan Botella, Chevremont (FR); Julien Cambillard, Belfort (FR); Alen Halepovic, Sainte Suzanne (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 16/386,385

(22) Filed: Apr. 17, 2019

(65) Prior Publication Data
US 2019/0323612 A1    Oct. 24, 2019

(30) Foreign Application Priority Data

Apr. 24, 2018 (FR) ...................................... 18 53582

(51) Int. Cl.
*F16K 1/22* (2006.01)
*F16K 27/02* (2006.01)
(Continued)

(52) U.S. Cl.
CPC .............. *F16K 1/225* (2013.01); *F01N 1/166* (2013.01); *F01N 1/18* (2013.01); *F16K 15/023* (2013.01); *F16K 27/0218* (2013.01)

(58) Field of Classification Search
CPC .... F16K 1/225; F16K 15/023; F16K 27/0218; F16K 1/2268; F02M 26/66; F02M 26/70;
(Continued)

(56) References Cited

U.S. PATENT DOCUMENTS

| 5,975,128 A | 11/1999 | Schatz |
| 2007/0131889 A1* | 6/2007 | Unbehaun ................. F02D 9/04 251/305 |

(Continued)

FOREIGN PATENT DOCUMENTS

| DE | 202011100120 U1 | 10/2011 |
| DE | 102011107024 A1 | 1/2013 |

(Continued)

OTHER PUBLICATIONS

French Search Report for French Patent Application No. 1853582, dated Jan. 15, 2019.

*Primary Examiner* — Marina A Tietjen
(74) *Attorney, Agent, or Firm* — Carlson, Gaskey & Olds, P.C.

(57) ABSTRACT

A valve includes a valve body having an exhaust gas inlet and an exhaust gas outlet, the valve body defining an exhaust gas circulation passage between the exhaust gas inlet and the exhaust gas outlet. A flap is arranged in the valve body and a shaft drives the flap in rotation with respect to the valve body. At least one guide bearing guides the drive shaft of the flap for rotation relative to the valve body. The guide bearing is engaged through an orifice of the valve body, with an inner end of the guide bearing being located inside the valve body. A first tube is engaged in one of the exhaust gas inlet and exhaust gas outlet and abuts against the inner end of the guide bearing.

17 Claims, 3 Drawing Sheets

(51) Int. Cl.
  *F02D 9/10*   (2006.01)
  *F16K 1/226*  (2006.01)
  *F02D 9/04*   (2006.01)
  *F01N 1/16*   (2006.01)
  *F01N 1/18*   (2006.01)
  *F16K 15/02*  (2006.01)

(58) Field of Classification Search
  CPC ... F01N 1/166; F01N 1/18; F02D 9/04; F02D 9/104; F02D 9/106
  See application file for complete search history.

(56) References Cited

U.S. PATENT DOCUMENTS

| | | | |
|---|---|---|---|
| 2015/0300268 A1* | 10/2015 | Evers | F16K 1/226 |
| | | | 60/324 |
| 2017/0089270 A1 | 3/2017 | Oblinger et al. | |
| 2017/0204756 A1* | 7/2017 | Middleton, Jr. | F01N 1/165 |
| 2018/0051609 A1* | 2/2018 | Geer | F01N 13/08 |

FOREIGN PATENT DOCUMENTS

| | | | |
|---|---|---|---|
| DE | 102019114306 A1 * | 12/2019 | |
| JP | S6231743 A | 2/1987 | |
| JP | H08261024 A | 10/1996 | |

* cited by examiner

PILOTED EXHAUST LINE VALVE AND CORRESPONDING PRODUCTION METHOD

CROSS-REFERENCE TO RELATED APPLICATIONS

This application is a U.S. non-provisional application claiming the benefit of French Patent Application No. 18 53582, filed on Apr. 24, 2018, which is incorporated herein by its entirety.

FIELD OF INVENTION

The invention generally concerns controlled valves for exhaust systems.

BACKGROUND OF THE INVENTION

Such piloted valves are normally installed in the exhaust systems of high-end motor vehicles. Exhaust systems for entry-level vehicles do not include such valves, due to their relatively high cost.

In the near future, new standards will be introduced to limit the noise emissions from vehicle exhaust systems even more severely. These standards will force car manufacturers to make widespread use of pilot operated valves, which are a technical solution to reduce noise emissions.

In this context, the invention aims to offer a valve whose manufacturing cost is reduced, and which can therefore be used on all kinds of exhaust lines without excessively increasing the cost of these lines.

SUMMARY OF THE INVENTION

A valve for an exhaust line comprises:
a valve body having an exhaust gas inlet and an exhaust gas outlet, the valve body defining an exhaust gas flow path between the exhaust gas inlet and the exhaust gas outlet;
a flap arranged in the valve body;
a drive shaft of the flap rotating relative to the valve body;
at least one guide bearing to guide the flap drive shaft for rotation relative to the valve body, the guide hearing engaged through an orifice in the valve body, with an inner end of the guide bearing being located inside the valve body; and
a first tube, engaged in one of the exhaust gas inlet and exhaust gas outlet and abutting against the inner end of the guide bearing.

Thus, it is not necessary to provide, in the valve body or on another valve component, a stop specifically designed to lock the first tube in position during assembly of the valve, when the first tube is engaged inside the valve body. This stop is achieved by using the guide bearing. The guide bearing thus allows the first tube to be held in its nominal position until the tube is fixed to the valve body.

The design of the valve is therefore simplified, and the number of parts making up the valve is reduced. As a result, the manufacturing cost of the valve is also reduced.

The valve may also have one or more of the following characteristics, considered individually or in all technically possible combinations:
the circulation passage has a central line from the exhaust gas inlet to the exhaust gas outlet, the guide bearing defining the position of the first tube with respect to the valve body along the central line;
a second tube is engaged in the other of the exhaust gas inlet and exhaust gas outlet and abutting against the inner end of the guide bearing;
the guide bearing comprises a tubular casing and a drive shaft guide member housed in the tubular casing, the first tube being in abutment against the tubular casing;
the first tube has a first end in which a notch surrounding the inner end of the guide bearing is cut;
the valve has only one guide bearing.

According to a second aspect, the invention concerns a method for manufacturing a valve for an exhaust line, the method including a step of obtaining a sub-assembly comprising:
a valve body having an exhaust gas inlet and an exhaust gas outlet, the valve body defining an exhaust gas flow path between the exhaust gas inlet and the exhaust gas outlet;
a flap arranged in the valve body;
a drive shaft of the flap rotating relative to the valve body;
at least one rotating guide bearing of the drive shaft, engaged through an opening in the valve body, one inner end of the guide bearing being located inside the valve body; and
the method further comprising a step of engaging a first tube in one of the exhaust gas inlet and exhaust gas outlet and abutting the first tube against the inner end of the guide bearing.

In addition, the method may have one or more of the following characteristics, considered individually or in all technically possible combinations:
the method includes, after the step of engaging and abutting the first tube, a step of fixing the first tube to the valve body;
the method comprises a step of engaging from one second tube to the other of the exhaust gas inlet and exhaust gas outlet and abutting the second tube against the inner end of the guide bearing; and
the method comprises, after the step of engaging and abutting the second tube, a step of fixing the second tube to the valve body.

A third aspect is that the invention concerns an exhaust line equipped with a valve having the above characteristics.

BRIEF DESCRIPTION OF THE DRAWINGS

Other characteristics and advantages of the invention will emerge from the detailed description given below, by way of indication and without limitation, with reference to the annexed figures, including.

DETAILED DESCRIPTION

Figure 1:
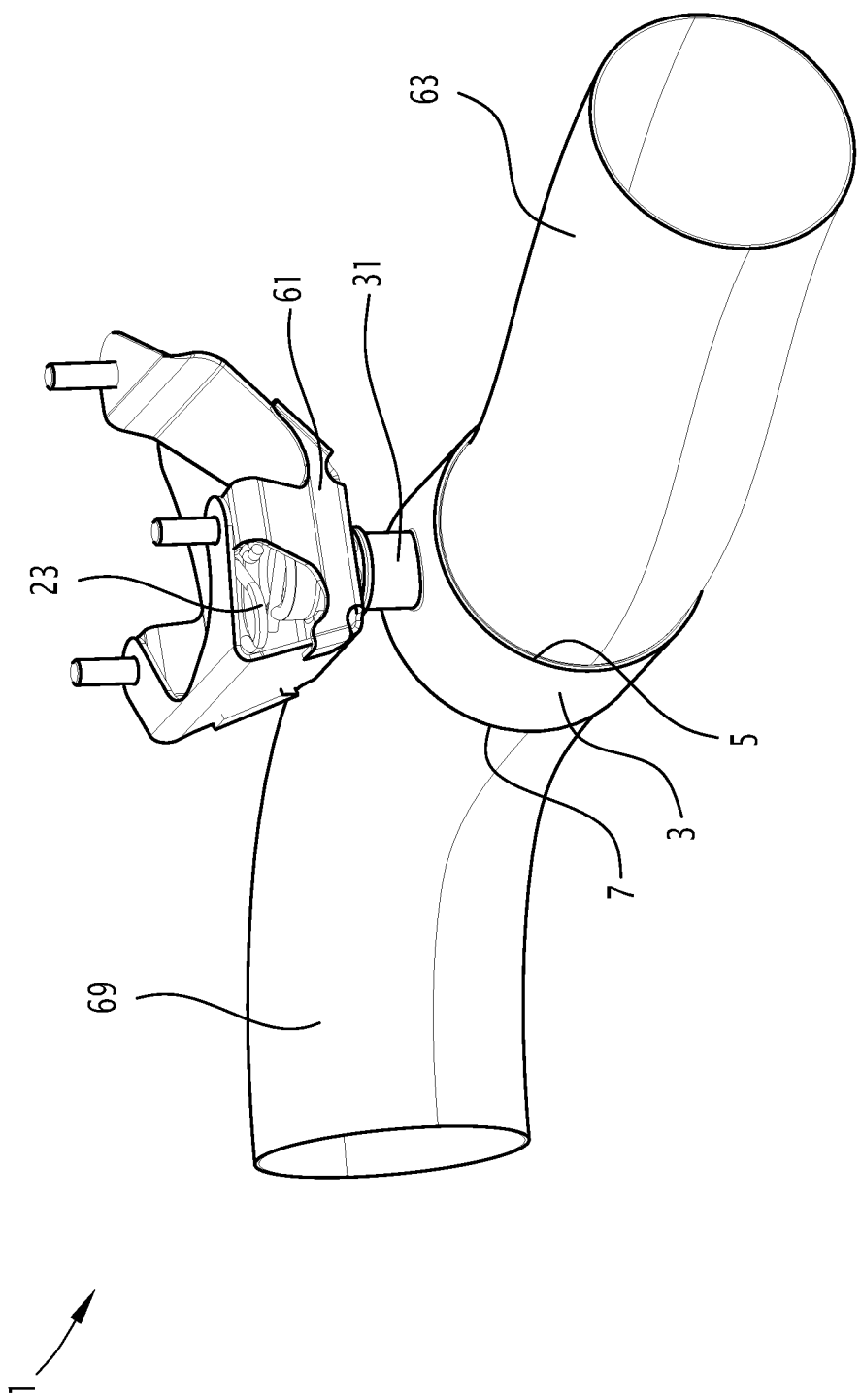
FIG. 1 is a perspective view of a valve in accordance with the invention, the actuator of the valve not being shown.
Figure 2:
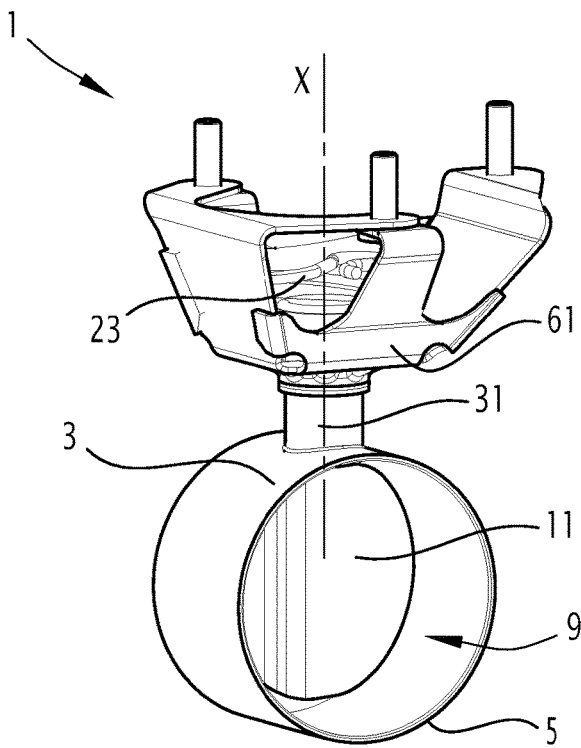
FIG. 2 is a perspective view similar to that in FIG. 1, with the first and second tubes not shown.
Figure 3:
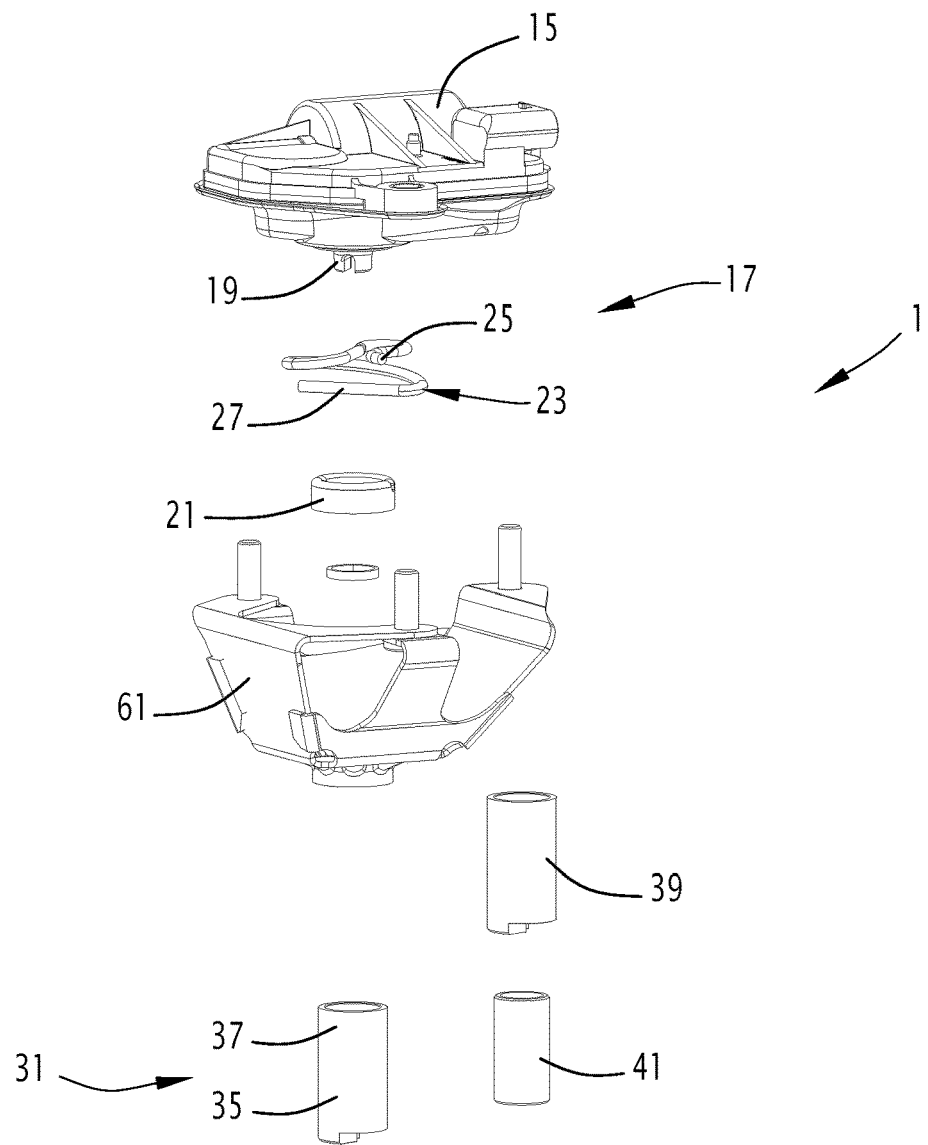
FIG. 3 is a perspective exploded view of the valve in FIGS. 1 and 2, without the first and second tubes but with the actuator.
Figure 3:
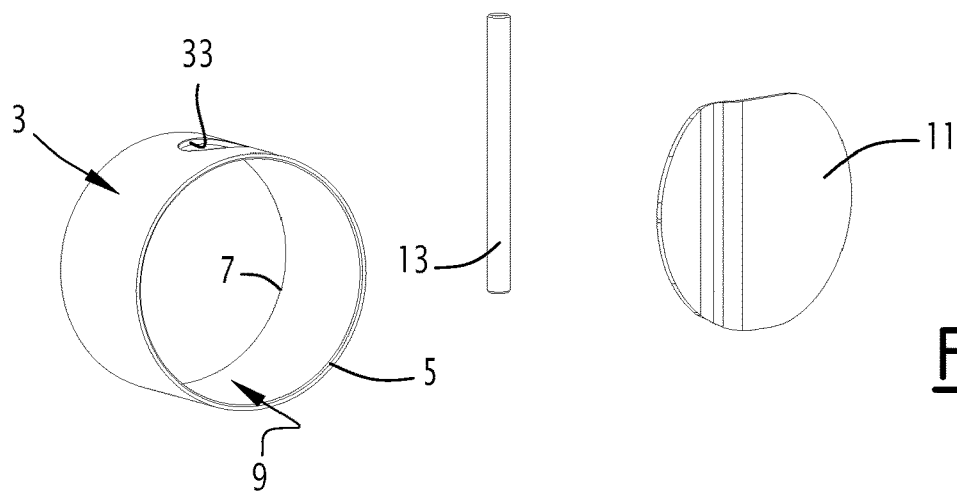

The valve 1 shown in FIGS. 1 to 3 is intended for installation in an exhaust system of an internal combustion engine vehicle. This vehicle is typically a motor vehicle such as a car or truck.

The valve 1 is designed, for example, to vary the cross-section of the exhaust gas passage in an exhaust system component, such as a tube or silencer, to modulate the amount of recirculated exhaust gas at the intake of the internal combustion engine (EGR, Exhaust Gas Recycling), or to divert all or part of the exhaust gas flow to a heat exchanger or bypass duct of an exhaust gas purification device such as a NOx trap or SCR (Selective Catalytic Reduction) catalyst.

The valve 1 has a valve body 3 with an exhaust gas inlet 5 and an exhaust gas outlet 7.

The valve body 3 defines an exhaust gas circulation passage 9 between the exhaust gas inlet 5 and the exhaust gas outlet 7. In the example shown, the valve body 3 is a pipe section with a circular cross-section. Alternatively, the valve body 3 has a different shape.

The valve 1 has a flap 11, which is located in the valve body 3. The valve 1 also includes a shaft 13 for driving the flap 11 in rotation with respect to the valve body 3 about an axis of rotation X.

In this description, the terms axial and radial refer to the axis of rotation X of the flap 11.

The drive shaft 13 is, for example, a solid or hollow metal tube. The flap 11 is, for example, a metal plate shaped by stamping. The flap 11 is rigidly fixed to the drive shaft 13, by any suitable method such as welding points. The flap 11 is typically circular or oval. The valve 1 is, for example, a butterfly valve, the drive shaft 13 extending along a median line of the flap 11.

The valve 1 has an actuator 15 and a transmission 17 configured to transmit motor torque between the actuator 15 and drive shaft 13. The actuator 15 is of all types. For example, the actuator 15 is an electric motor reducer.

The transmission 17 includes, for example, a driver 19 driven in rotation by the actuator 15, an adapter 21 directly attached to the drive shaft 13, and an elastic member 23 coupling the adapter 21 and the driver 19 in rotation.

The driver 19 is, for example, the output shaft of the actuator 15.

For example, the adapter 21 is a metal plate, rigidly fixed to the drive shaft 13. The torque is transmitted between the driver 19 and the adapter 21 only by the elastic member 23.

Figure 4:
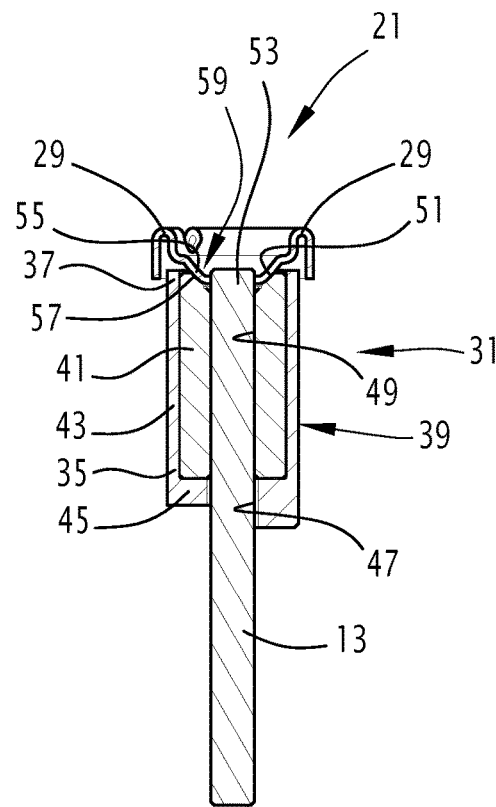
FIG. 4 is an axial cross-sectional view of the guide bearing, drive shaft and valve adapter from FIGS. 1 to 3.

The elastic member 23 is, for example, a wire bent to an appropriate shape. A first end 25 of the elastic member 23 is engaged in a notch, not shown, in the driver 19. A second end 27 of the elastic member 23 is engaged in notches 29 in adapter 21 and shown in FIG. 4.

The valve 1 has at least one guide bearing 31 for rotating the drive shaft 13 of the flap 11 with respect to the valve body 3. This guide bearing 31 is engaged through an orifice 33 of the valve body 3, an inner end 35 of the guide bearing 31 being located inside the valve body 3.

In addition, an outer end 37 of the guide bearing 31 is located outside the valve body 3.

The guide bearing 31 is rigidly fixed to the valve body 3 by any suitable method. For example, the guide bearing 31 is welded tightly to the edge of the orifice 33.

The guide bearing 31 has a tubular casing 39 and a guide member 41 for the drive shaft 13, housed in the tubular casing 39. The tubular casing 39 has a cylindrical wall 43, coaxial with the axis of rotation X of the flap 11, which is itself combined with the drive shaft 13. The cylindrical wall 43 is open at the outer end 37, and is partially closed by a bottom 45 at the inner end 35 of the guide bearing 31. The bottom 45 has a central hole 47 through which the drive shaft 13 passes.

The guide member 41 has the general shape of a hollow cylinder. It has a central passage 49, aligned with the central hole 47 and coaxial with the axis of rotation X. The drive shaft 13 is received in the central passage 49.

The guide member 41 is supported at a lower end against the bottom 45. The guide member 41 is supported radially outwards against the cylindrical wall 43 of the tubular casing 39. At its axial end opposite the bottom 45, the guide member 41 is delimited by a free surface 51, turned axially opposite the valve body 3. The central passage 49 opens into the center of the free surface 51.

An end part 53 of the drive shaft 13 projects out of the central passage 49. The adapter 21 is rigidly attached to the end part 53.

The guide member 41 comprises a wire mesh, and/or a material selected from graphite and ceramic, or any combination of this or these materials with a wire mesh.

For example, the guide member 41 is made entirely of a wire mesh, or entirely of graphite or ceramic, or it includes both a wire mesh and graphite and/or ceramic.

The adapter 21 has a contact surface 55 in sealed contact with an additional surface 57 on the guide bearing 31. The additional surface 57 is provided on the guide member 41, and more precisely on the free surface 51. The contact surface 55 is defined by a convex central portion 59 of the adapter 21, convex towards the guide bearing 31. The contact surface 55 is loaded axially against the complementary additional surface 57 by the elastic member 23.

For example, the contact surface 55 has an arc-shaped cross-section in a radial plane from the axis of rotation X.

The complementary additional surface 57 is frustoconical and coaxial with the axis of rotation X.

In this case, the contact is linear.

Alternatively, it is the reverse. The complementary additional surface 57, in a radial plane from the axis of rotation X, has an arcuate section, and the contact surface 55 is frustoconical. In another variant, both surfaces 55 and 57 are frustoconical, and the contact between the contact surface 55 and the complementary additional surface 57 is made on a two-dimensional, frustoconical surface.

The actuator 15 is rigidly fixed to the guide bearing 31 by a bracket 61.

The output shaft driver 19 is placed in the axial extension of the drive shaft 13.

Figure 5:
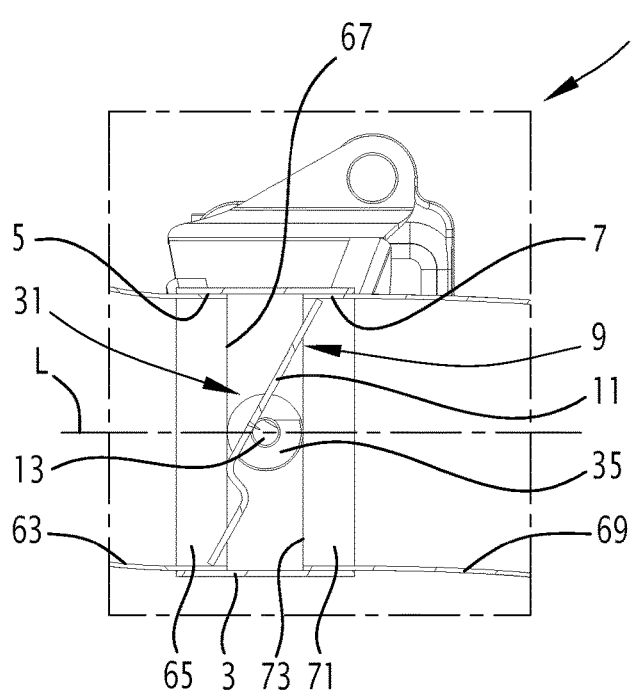
FIG. 5 is a cross-sectional view in a plane perpendicular to the axis of rotation, with the inlet and outlet tubes only partially represented.

The valve 1 also has a first tube 63 engaged in the exhaust gas inlet 5 and abutting against the inner end 35 of the guide bearing 31. This situation is shown in FIG. 5.

The first tube 63 is connected fluidly upstream to the collector (not shown) collecting exhaust gases from the vehicle's internal combustion engine. Typically, other equipment such as a turbocharger or exhaust gas purification devices are interposed between the first tube 63 and the manifold.

The first tube 63 has a first end 65, delimited by a free edge 67. The free edge 67 is in abutment against the inner end 35 of the guide bearing 31.

More precisely, the first tube 63 is in abutment against the tubular casing 39 of the guide bearing 31.

As shown in FIG. 5, the first tube 63 communicates fluidly with the exhaust gas circulation passage 9 through the first end 65.

Preferably, the first end 65 has an outer section that is approximately identical to the inner section of exhaust gas inlet 5. In the example shown, the outer section and the inner section are circular.

The first tube 63 is tightly fixed to the valve body 3 by any suitable method.

As shown in FIG. 5, the exhaust gas flow passage 9 has a central line L from the exhaust gas inlet 5 to the exhaust gas outlet 7.

The center line L passes through the geometric centers of the sections of the exhaust passage 9 that follow each other when passing through this exhaust passage 9 from the exhaust inlet 5 to the exhaust outlet 7.

The center line L is straight in the example shown. Depending on the shape of valve body 3, and in particular the exhaust gas circulation passage 9, it may not be straight. For example, the center line L has several straight sections forming angles with each other or arched sections.

The guide bearing 31 defines the position of the first tube 63 with respect to the valve body 3 along the center line L.

The valve 1 has a second tube 69 engaged in the exhaust gas outlet 7. The second tube 69 is also abutting the inner end 35 of the guide bearing 31. The second tube 69 has a second end 71 bounded by a free edge 73. The free edge 73 is in abutment against the guide bearing 31, and more precisely against the inner end 35 of the guide bearing 31.

As before, the guide bearing 31 defines the position of the second tube 69 with respect to the valve body 3 along the center line L.

The second end 71 has an outer section that is approximately identical in shape to the inner section of the exhaust outlet 7. In the example shown, the outer and inner sections are circular. The second tube 69 is sealed to the valve body 3 by any suitable method.

Figure 6:
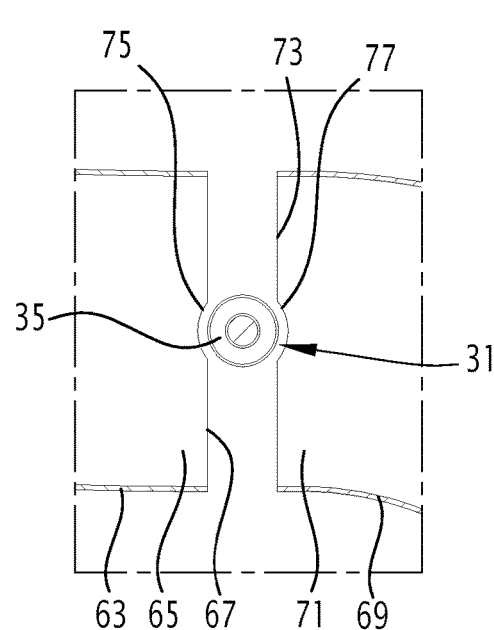
FIG. 6 is a simplified view, showing the guide bearing and the inlet and outlet tubes, for a variant of the invention.

According to a design variant shown in FIG. 6, a notch 75 is cut in the first end 65 of the first tube 63. More precisely, this notch 75 is cut out of the free edge 67. The notch 75 surrounds the inner end 35 of the guide bearing 31.

In other words, the inner end 35 of the guide bearing 31 is engaged in the notch 75.

Advantageously, the inner end 35 of the guide bearing 31 has, in a plane perpendicular to the axis of rotation X, a conjugated section in the shape of notch 75. Thus, the edge of the notch 75 is virtually flattened along its entire length on the outer surface of the guide bearing 31.

Similarly, a notch 77 is advantageously cut in the second end 71 of the second tube 69. This notch 77 surrounds the inner end 35 of the guide bearing 31. Advantageously, the external surface, taken in a plane perpendicular to the axis of rotation X, of said inner end 35 is combined with the shape of notch 77. The edge of the notch 77 is thus practically pressed against the outer surface of the inner end 35 of the guide bearing 31 over its entire length.

This allows the first tube 63 and the second tube 69 to be considerably closer to each other along the center line L.

Advantageously, the free edges 67 and 73 practically touch, the notches 75 and 77 surrounding the guide bearing 31 over almost its entire periphery.

Such an arrangement shortens the length of the valve body 3.

A second aspect is that the invention concerns a method for manufacturing a valve 1 for an exhaust line.

The method involves a step of obtaining a sub-assembly comprising:
a valve body 3 having an exhaust gas inlet 5 and an exhaust gas outlet 7, the valve body 3 delimiting an exhaust gas circulation passage 9 between the exhaust gas inlet 5 and the exhaust gas outlet 7;
a flap 11 arranged in the valve body 3;
a shaft 13 for driving the flap 11 in rotation with respect to the valve body 3;
at least one rotational guide bearing 31 of the drive shaft 13, engaged through an orifice 33 of the valve body 3, an inner end 35 of the guide bearing 31 being located inside the valve body 3.

The method also includes a step of engaging a first tube 63 in the exhaust gas inlet 5 and abutting the first tube 63 against the inner end 35 of the guide bearing 31.

Advantageously, the method also includes, after the step of engaging and abutting the first tube 63, a step of fixing the first tube 63 to the valve body 3.

The fixing step allows the first tube 63 to be fixed tightly to the valve body 3.

Typically, the method also includes a step of engaging a second tube 69 in the exhaust gas outlet 7 and abutting the second tube 69 against the inner end 35 of the guide bearing 31.

Advantageously, the method also includes a step of fixing the second tube 69 to the valve body 3, after the step of engaging and abutting the second tube 69.

The second tube 69 is sealed to the valve body 3.

Typically, the valve 1 is of the type described above. The valve 1 above is particularly suitable for being manufactured according to the invention method.

The valve 1 and the manufacturing method can have multiple variants.

In the design example described above, the valve 1 has a single rotating guide bearing 31 on the drive shaft 13. This is of great length, in order to ensure a good rotational guidance of the drive shaft 13. Alternatively, the valve 1 has a second guide bearing, which guides the end of the drive shaft 13 opposite the adapter 21 in rotation.

In this case, the first tube 63 and/or the second tube 69 is advantageously in abutment against both the inner end 35 of the guide bearing 31 and the second guide bearing.

It has been described above that the guide bearing 31, against which the first tube 63 and/or the second tube 69 comes into contact, is designed to guide the end of the drive shaft 13 to which the transmission 17 is connected. Alternatively, the guide bearing 31 guides the end of the drive shaft 13 that is not connected to the transmission 17.

In the example described above, the first tube 63 and the second tube 69 are both abutted against the inner end 35 of the guide bearing 31. Alternatively, only the first tube 63 is placed against the inner end 35 of the guide bearing 31.

It has been described above that the first tube 63 is engaged in the exhaust gas inlet 5. Alternatively, the first tube 63 is engaged in the exhaust gas outlet 7. The second tube 69 is engaged in the exhaust gas inlet 5.

A third aspect is that the invention concerns an exhaust line equipped with a valve 1 having the above characteristics.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A valve for an exhaust line, the valve comprising:
a valve body having an exhaust gas inlet and an exhaust gas outlet, the valve body defining an exhaust gas circulation passage between the exhaust gas inlet and the exhaust gas outlet, and wherein the exhaust gas circulation passage has a central line from the exhaust gas inlet to the exhaust gas outlet;
a flap arranged in the valve body;

a drive shaft that drives the flap in rotation with respect to the valve body;

at least one guide bearing that guides the drive shaft of the flap for rotation relative to the valve body, the at least one guide bearing engaged through an orifice of the valve body, an inner end of the at least one guide bearing being located inside the valve body;

a first tube, engaged in one of the exhaust gas inlet and exhaust gas outlet, and abutting against the inner end of the at least one guide bearing along the central line of the exhaust gas circulation passage, and wherein the at least one guide bearing defines a position of the first tube with respect to the valve body along the central line; and a second tube engaged in the other of the exhaust gas inlet and exhaust gas outlet and abutting against the inner end of the at least one guide bearing.

2. The valve according to claim 1, wherein the at least one guide bearing comprises a tubular casing and a member that guides the drive shaft housed in the tubular casing, the first tube being in abutment against the tubular casing.

3. The valve according to claim 1, wherein the first tube has a first end in which a notch surrounding the inner end of the at least one guide bearing is cut.

4. The valve according to claim 1, wherein the at least one guide bearing comprises a single guide bearing.

5. An exhaust line comprising a valve according to claim 1.

6. The valve according to claim 1, wherein the at least one guide bearing comprises a tubular casing and a member that guides the drive shaft housed in the tubular casing, the tubular casing extending into the exhaust gas circulation passage such that an end face of the first tube abuts directly against an inner end of the tubular casing.

7. A method of manufacturing a valve for an exhaust line comprising:

obtaining a sub-assembly comprising:

a valve body having an exhaust gas inlet and an exhaust gas outlet, the valve body defining an exhaust gas circulation passage between the exhaust gas inlet and the exhaust gas outlet, and wherein the exhaust gas circulation passage has a central line from the exhaust gas inlet to the exhaust gas outlet, a flap arranged in the valve body, a drive shaft that drives the flap in rotation with respect to the valve body, and at least one guide bearing that guides the drive shaft and is engaged through an orifice of the valve body, wherein an inner end of the at least one guide bearing is located inside the valve body;

engaging a first tube in one of the exhaust gas inlet and exhaust gas outlet and abutting the first tube against the inner end of the at least one guide bearing along the central line of the exhaust gas circulation passage, and wherein the at least one guide bearing defines a position of the first tube with respect to the valve body along the central line; and engaging a second tube in the other of the exhaust gas inlet and exhaust gas outlet and abutting the second tube against the inner end of the at least one guide bearing.

8. The method according to claim 7, including fixing the first tube to the valve body subsequent to engaging and abutting the first tube.

9. The method according to claim 7, including fixing the second tube to the valve body subsequent to engaging and abutting the second tube.

10. The method according to claim 7, wherein the at least one guide bearing comprises a tubular casing and a member that guides the drive shaft housed in the tubular casing, and including extending the tubular casing into the exhaust gas circulation passage such that an end face of the first tube abuts directly against an inner end of the tubular casing.

11. A valve for an exhaust line, the valve comprising:

a valve body having an exhaust gas inlet and an exhaust gas outlet, the valve body defining an exhaust gas circulation passage between the exhaust gas inlet and the exhaust gas outlet, and wherein the exhaust gas circulation passage has a central line from the exhaust gas inlet to the exhaust gas outlet, a flap arranged in the valve body;

a drive shaft that drives the flap in rotation with respect to the valve body;

at least one guide bearing that guides the drive shaft of the flap for rotation relative to the valve body, the at least one guide bearing engaged through an orifice of the valve body, an inner end of the at least one guide bearing being located inside the valve body, and wherein the at least one guide bearing comprises a tubular casing and a member that guides the drive shaft housed in the tubular casing; and a first tube, engaged in one of the exhaust gas inlet and exhaust gas outlet, and abutting against the inner end of the at least one guide bearing along the central line of the exhaust gas circulation passage, and wherein the at least one guide bearing defined a position of the first tube with respect to the valve body along the central line, and the tubular casing extending into the exhaust gas circulation passage such that an end face of the first tube abuts directly against an inner end of the tubular casing, and wherein the tubular casing has a cylindrical wall that is coaxial with an axis of rotation of the shaft, and wherein the cylindrical wall is open at an outer end of the at least one guide bearing, and is partially closed by a bottom at the inner end of the at least one guide bearing, and wherein the end face of the first tube abuts directly against an outer peripheral surface of the cylindrical wall such that the cylindrical wall is directly between the first pipe and the member that guides the drive shaft.

12. The valve according to claim 11, including a driver driven in rotation by an actuator, an adapter directly attached to the drive shaft, and an elastic member coupling the adapter and the driver in rotation.

13. The valve according to claim 12, wherein the guide member comprises a hollow cylinder and is supported at a lower end against the bottom, and at an axial end opposite the bottom, the guide member is delimited by a free surface, and wherein the adapter has a contact surface in sealed contact with an additional surface provided on the free surface, and wherein the contact surface is loaded axially against the additional surface by the elastic member.

14. The valve according to claim 13, wherein one of the contact surface and the additional surface is defined by a convex central portion having an arc-shaped cross-section and the other of the contact surface and the additional surface is frustoconical.

15. The method according to claim 11, including a driver driven in rotation by an actuator, an adapter directly attached to the drive shaft, and an elastic member coupling the adapter and the driver in rotation, and wherein the guide member comprises a hollow cylinder and is supported at a lower end against the bottom, and at an axial end opposite the bottom, the guide member is delimited by a free surface, and wherein the adapter has a contact surface in sealed contact with an additional surface provided on the free surface, and including axially loading the contact surface against the additional surface via the elastic member.

16. The method according to claim 15, wherein one of the contact surface and the additional surface is defined by a convex central portion having an arc-shaped cross-section and the other of the contact surface and the additional surface is frustoconical.

17. A method of manufacturing a valve for an exhaust line comprising:
    obtaining a sub-assembly comprising:
        a valve body having an exhaust gas inlet and an exhaust gas outlet, the valve body defining an exhaust gas circulation passage between the exhaust gas inlet and the exhaust gas outlet, and wherein the exhaust gas circulation passage has a central line from the exhaust gas inlet to the exhaust gas outlet,
        a flap arranged in the valve body,
        a drive shaft that drives the flap in rotation with respect to the valve body, and
        at least one guide bearing that guides the drive shaft and is engaged through an orifice of the valve body, where an inner end of the at least one guide bearing is located inside the valve body, and wherein the at least one guide bearing comprises a tubular casing and a member that guides the drive shaft housed in the tubular casing; and
    engaging a first tube in one of the exhaust gas inlet and exhaust gas outlet and abutting the first tube against the inner end of the at least one guide bearing along the central line of the exhaust gas circulation passage, and wherein the at least one guide bearing defines a position of the first tube with respect to the valve body along the central line, and including extending the tubular casing into the exhaust circulation passage such that an end face of the first tube abuts directly against an inner end of the tubular casing, wherein the tubular casing has a cylindrical wall that is coaxial with an axis of rotation of the shaft, and wherein the cylindrical wall is open at an outer end of the at least one guide bearing, and is partially closed by a bottom at the inner end of the at least one guide bearing, and an including abutting the end face of the first tube directly against an outer peripheral surface of the cylindrical wall such that the cylindrical wall is directly between the first pipe and the member that guides the drive shaft.

* * * * *

UNITED STATES PATENT AND TRADEMARK OFFICE
CERTIFICATE OF CORRECTION

Page 1 of 2

PATENT NO. : 10,989,309 B2
APPLICATION NO. : 16/386385
DATED : April 27, 2021
INVENTOR(S) : Ronan Botella, Julien Cambillard and Alen Halepovic It is certified that error appears in the above-identified patent and that said Letters Patent is hereby corrected as shown below:

In the Claims

In Claim 11, Column 8, Line 29; replace "defined a position" with --defines a position--

In Claim 11, Column 8, Line 35; replace "rotation of the shaft" with --rotation of the drive shaft--

In Claim 11, Column 8, Line 42; replace "the first pipe" with --the first tube--

In Claim 13, Column 8, Line 48; replace "the guide member" with --the member that guides the drive shaft--

In Claim 13, Column 8, Line 51; replace "the guide member" with --the member that guides the drive shaft--

In Claim 15, Column 8, Line 61; replace "claim 11" with --claim 10--

In Claim 15, Column 8, Line 64; replace "the guide member" with --the member that guides the drive shaft--

In Claim 15, Column 8, Line 65; replace "the bottom, and" with --a bottom of the tubular casing, and--

In Claim 15, Column 8, Line 67; replace "the guide member" with --the member that guides the drive shaft--

In Claim 17, Column 10, Line 11; replace "the exhaust circulation passage" with --the exhaust gas circulation passage--

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*

In Claim 17, Column 10, Line 15; replace "rotation of the shaft" with --rotation of the drive shaft--

In Claim 17, Column 10, Line 22; replace "the first pipe" with --the first tube--